United States Patent
Abe et al.

(10) Patent No.: US 10,737,627 B2
(45) Date of Patent: Aug. 11, 2020

(54) LUGGAGE ROOM ASSEMBLY MOUNTED IN VEHICLE

(71) Applicants: TOYOTA BOSHOKU KABUSHIKI KAISHA, Aichi (JP); TOYOTA JIDOSHA KABUSHIKI KAISHA, Aichi-ken (JP)

(72) Inventors: Ryuhei Abe, Aichi-ken (JP); Mitsuaki Eshima, Aichi-ken (JP); Shoichi Hasegawa, Aichi-ken (JP)

(73) Assignees: TOYOTA BOSHOKU KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 45 days.

(21) Appl. No.: 16/189,189

(22) Filed: Nov. 13, 2018

(65) Prior Publication Data
US 2019/0152400 A1 May 23, 2019

(30) Foreign Application Priority Data

Nov. 20, 2017 (JP) ................................ 2017-222857

(51) Int. Cl.
*B60R 5/04* (2006.01)
*B60R 13/01* (2006.01)
*B60R 11/00* (2006.01)

(52) U.S. Cl.
CPC ............ *B60R 5/044* (2013.01); *B60R 13/013* (2013.01); *B60R 2011/0036* (2013.01)

(58) Field of Classification Search
CPC ............................. B60R 5/044; B60R 13/013; B60R 2011/0036
(Continued)

(56) References Cited

U.S. PATENT DOCUMENTS 4,479,675 A * 10/1984 Zankl ...................... B60R 5/044
16/230
4,648,648 A * 3/1987 Shigesada ............... B60R 5/044
296/37.16

(Continued)

FOREIGN PATENT DOCUMENTS

JP H02-007193 1/1990
JP 2000-203344 7/2000
(Continued)

OTHER PUBLICATIONS

Japanese Office Action in counterpart Japanese Application No. 2017-222857, dated Mar. 3, 2020 (and English translation thereof).

*Primary Examiner* — Pinel E Romain
(74) *Attorney, Agent, or Firm* — Greenblum & Bernstein, P.L.C.

(57) ABSTRACT

A luggage room assembly mounted in a vehicle includes a deck board configured to be movable between a laid state and a lifted state and including a handle member on a floor surface thereof, the handle member being movable between a projected state in which the handle member projects from the floor surface and a non-projected state in which the handle member does not project from the floor surface, and a package tray disposed above the deck board and having a rear surface that is opposite the floor surface of the deck board and to which the handle member in the projected state is connected when the deck board is in the lifted state.

14 Claims, 7 Drawing Sheets

(58) Field of Classification Search
USPC .................................................. 296/37.16, 76
See application file for complete search history.

(56) References Cited

U.S. PATENT DOCUMENTS

| | | | | |
|---|---|---|---|---|
| 5,865,497 | A * | 2/1999 | Klein .................... | B60R 5/044 292/338 |
| 7,566,082 | B2 * | 7/2009 | Hofmann ............... | B60R 5/045 296/37.14 |
| 8,960,755 | B2 * | 2/2015 | Cassiani ................ | F16G 11/03 296/24.43 |
| 10,286,848 | B2 * | 5/2019 | Herman ................. | B60R 5/045 |
| 2008/0157546 | A1 * | 7/2008 | Vitry ..................... | E05B 5/00 292/226 |
| 2009/0096238 | A1 * | 4/2009 | Misch .................... | B60J 7/20 296/37.1 |
| 2009/0146445 | A1 * | 6/2009 | Bernhardsson ........ | B60R 11/00 296/37.14 |
| 2016/0096479 | A1 | 4/2016 | Nedelman | |
| 2016/0107581 | A1 * | 4/2016 | Bergdahl ............... | B60R 7/02 224/496 |
| 2016/0144903 | A1 * | 5/2016 | Cassiani ................ | B60R 11/00 296/184.1 |
| 2018/0016817 | A1 * | 1/2018 | Ayala Diaz ............ | E05B 85/10 |
| 2018/0127031 | A1 * | 5/2018 | Ono ....................... | B60R 13/013 |

FOREIGN PATENT DOCUMENTS

| | | |
|---|---|---|
| JP | 2008-290647 | 12/2008 |
| JP | 2009-113608 | 5/2009 |
| JP | 2012-091644 | 5/2012 |

* cited by examiner

FR ←——→ RR

LUGGAGE ROOM ASSEMBLY MOUNTED IN VEHICLE

CROSS REFERENCE TO RELATED APPLICATION

This application claims priority from Japanese Patent Application No. 2017-222857 filed on Nov. 20, 2017. The entire contents of the priority application are incorporated herein by reference.

TECHNICAL FIELD

The present disclosure relates to a luggage room assembly mounted in a vehicle.

BACKGROUND

A vehicular luggage room assembly with a deck board having a following structure has been known. In such an assembly, a vehicle has a luggage room in a rear section thereof and the luggage room has a recess formed in a floor surface of the rear section. The deck board is a cover that closes an upper opening of the luggage room in a normal state. When an object in the luggage room is taken out of it, the deck board is lifted up such that a rear portion thereof is lifted up around a front side cut-out portion thereof as a pivot and a hook is pulled out of a rear surface of the deck board and is hooked on a rod mounted on the seat. Thus, the deck board is kept in a tilted state and the luggage room is open.

In the above configuration of the deck board, when an operator takes out the hook from the rear surface of the deck board, he/she needs to support the deck board with one hand and take out the hook from the deck board with another hand. Thus, an operation with both hands is necessary for taking out the hook from the deck board. However, if an operator has a luggage in one hand and only the other hand is free, it is quite hard to take out the hook from the deck board with just one hand. The operator needs to put the luggage on a ground once and take out the hook from the deck board with the two hands. This may be quite troublesome.

SUMMARY

An object of the present technology is to provide a luggage room assembly mounted in a vehicle in which a deck board is lifted up and kept in a lifted state easily with one hand. Another object of the present technology is to provide a luggage room assembly mounted in a vehicle in which an operator can access a space below a deck board more easily. Another object of the present technology is to provide a luggage room assembly in which a deck board in a horizontal normal state is less likely to damage other components.

A luggage room assembly mounted in a vehicle of the present technology includes a deck board configured to be movable between a laid state and a lifted state and including a handle member on a floor surface thereof, the handle member being movable between a projected state in which the handle member projects from the floor surface and a non-projected state in which the handle member does not project from the floor surface, and a package tray disposed above the deck board and having a rear surface that is opposite the floor surface of the deck board and to which the handle member in the projected state is connected when the deck board is in the lifted state.

DETAILED DESCRIPTION

One embodiment of the present technology will be described with reference to FIGS. 1 to 6. In FIGS. 1 to 4, FR represents a vehicular front side, RR represents a vehicular rear side, R represents a vehicular right side, and L represents a vehicular left side. In this embodiment section, a hatchback type automobile is described as a vehicle 100 and a luggage room assembly 200 mounted in the vehicle 100 will be described.

Figure 1:
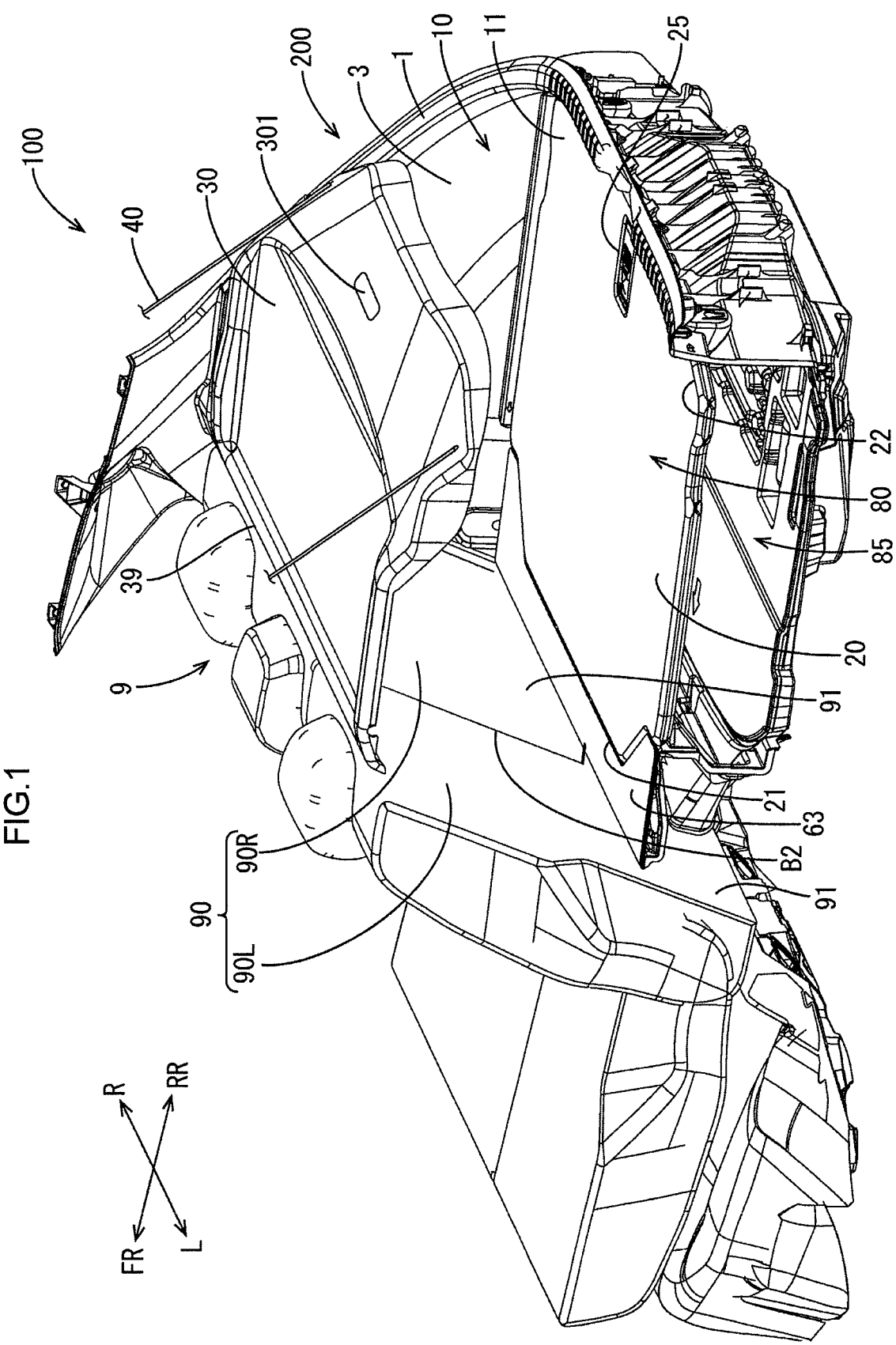
FIG. 1 is a perspective view of a vehicular luggage room seen from a vehicular left rear side and illustrating a package tray and a deck board that are in a horizontal state.

As illustrated in FIG. 1, the vehicle 100 includes a luggage room 10 and a vehicular back door in a rear section thereof. The vehicular back door is connected to a package tray 30 via a connecting member 40. The luggage room 10 can be accessed through a vehicular rear side opening 1 while the vehicular back door being open. The vehicle 100 includes a rear seat (a passenger's seat) 9 next to the luggage room 10 on a vehicular front side of the luggage room 10.

Figure 2:
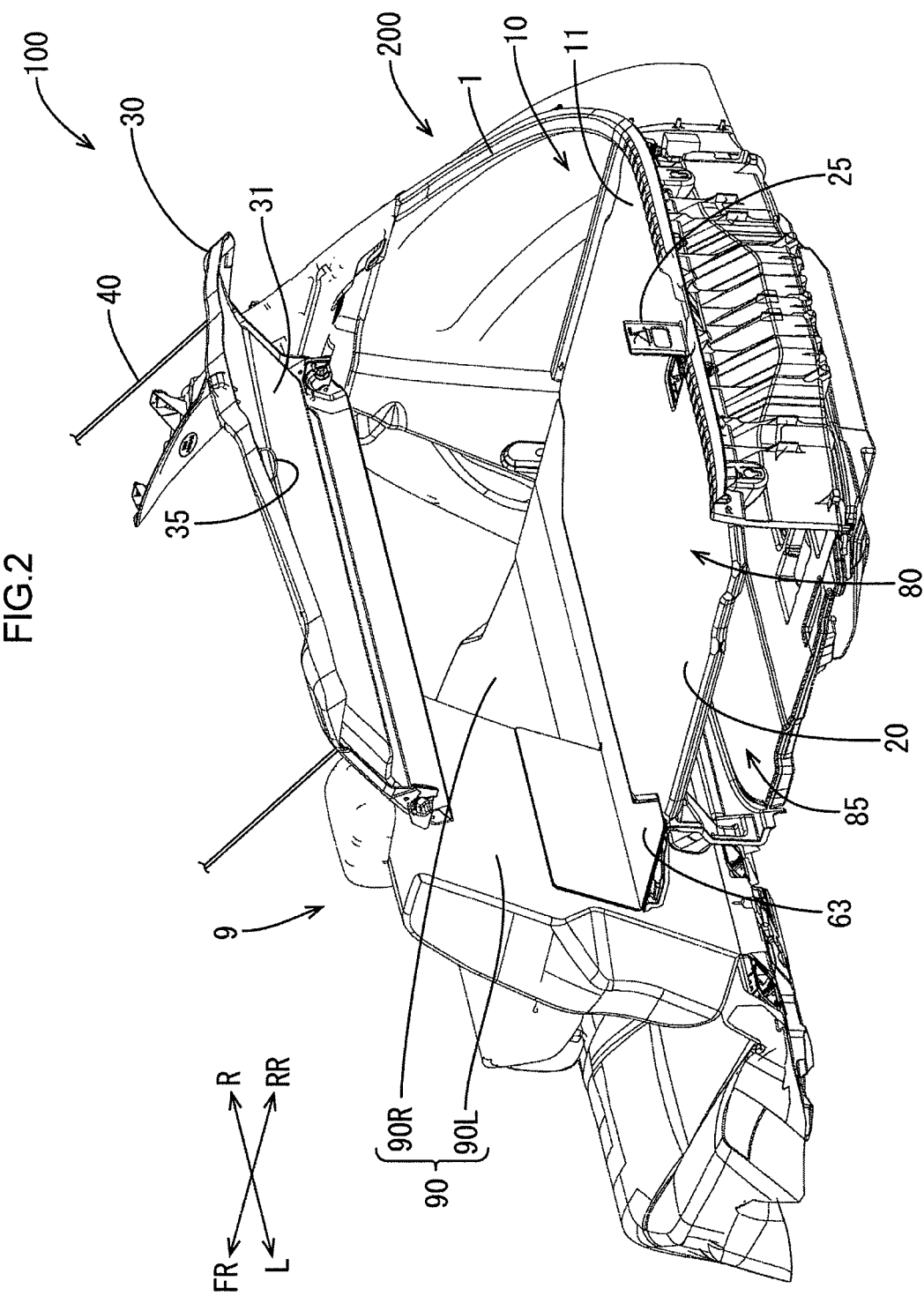
FIG. 2 is a perspective view of the vehicular luggage room seen from the vehicular left rear side and illustrating the package tray that is lifted up and in a tilted state and the deck board that is in a horizontal state.

The rear seat 9 includes a seat back 90 that is arranged in the vehicle 100 such that a rear surface 91 thereof is substantially vertical. The seat back 90 includes a left seat back 90L and a right seat back 90R with respect to a vehicular width direction. As illustrated in FIG. 2, each of the left seat back 90L and the right seat back 90R can be folded down frontward independently. The rear seat 9 has a border line B2 between the left seat back 90L and the right seat back 90R and a ratio of the left seat back 90L and the right seat back 90R with respect to a width dimension is approximately 40:60.

As illustrated in FIG. 1, the luggage room 10 includes the seat back 90 of the rear seat 9 as a vehicular front wall, a deck side trim 3 as a vehicular side wall, and a deck board 20 as a floor surface 11. The luggage room 10 has a first storing space 80 that is defined by the seat back 90, the deck side trim 3, and the deck board 20. The deck board 20 is a plate member that extends horizontally in a normal state and any objects such as luggage are placed on an upper surface of the deck board 20. In the normal state, the vehicular back door is closed and luggage can be placed on the deck board 20 as a bottom surface in the first storing space 80. The luggage room 10 further includes a second storing space 85 below the deck board 20 and the second storing space 85 is in a recess. Any objects such as luggage can be stored in the second storing space 85 under the deck board 20, which is the floor.

Figure 3:
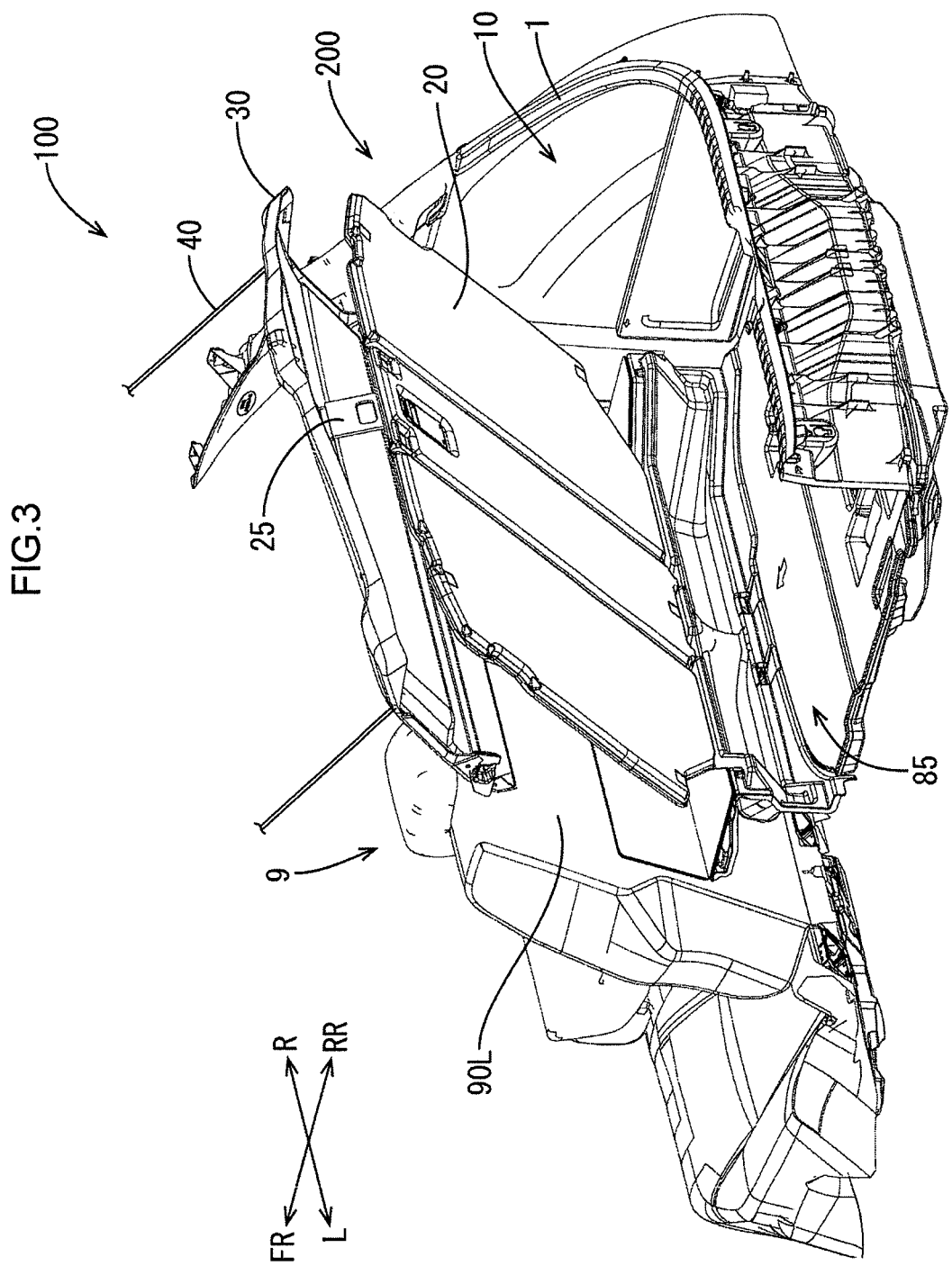
FIG. 3 is a perspective view of the vehicular luggage room seen from the vehicular left rear side and illustrating the package tray and the deck board that are tilted and the deck board that is connected to a rear surface of the package tray.

The deck board 20 is connected to a floor member 63 at a vehicular front edge portion 21 thereof such that a vehicular rear edge 22 portion thereof is moved up and down while the vehicular front edge portion 21 being supported as a pivot. FIG. 1 illustrates the deck board 20 that is in a horizontal state (a laid state). The deck board 20 that is in the horizontal state is lifted up and pivoted around the front edge portion 21 and then, the deck board 20 is in a tilted state (a lifted state) as illustrated in FIG. 3. Thus, the deck board 20 is configured to be movable between the horizontal state and the tilted state. When the deck board 20 is in the tilted state, the second storing space 85 below the deck board 20 can be accessed.

Figure 5:
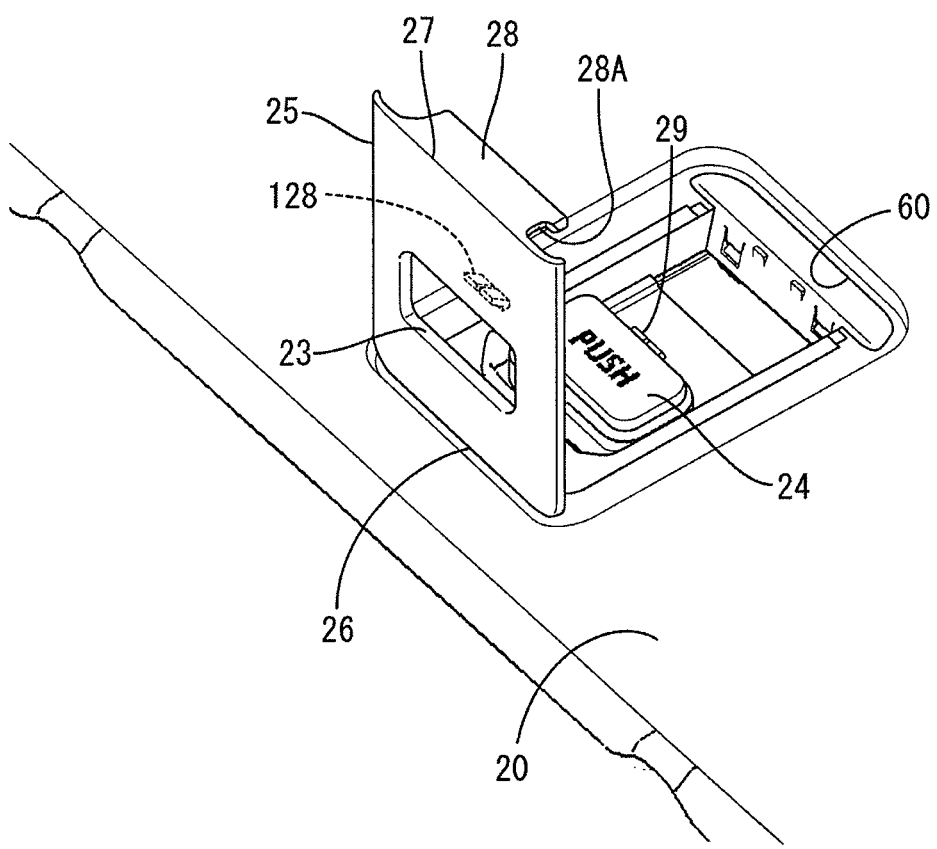
FIG. 5 is a perspective view of a handle member mounted in the deck board.

The deck board 20 includes a handle member 25 on the floor surface 11. The handle member 25 is mounted in the deck board 20 to be movable between a horizontal state (a non-projecting state) in which the handle member 25 is flat with respect to the floor surface 11 as illustrated in FIG. 1 and a lifted state (a projecting state) in which the handle member 25 is lifted vertically from the floor surface 11 as illustrated in FIG. 2. Specifically, as illustrated in FIG. 5, the handle member 25 is lifted up by lifting upward a vehicular front end portion 27 of the handle member 25, which is in the horizontal state as is in FIG. 1, around a vehicular rear end portion 26 thereof as a pivot. Thus, the handle member 25 is moved to the lifted state. As illustrated with a broken line in FIG. 5, the handle member 25 has a projecting piece 128 and a stopper piece 28 on a surface thereof facing the vehicular front side in the lifted state. The projecting piece 128 and the stopper piece 28 projects toward the vehicular front side when the handle member 25 is in the lifted state. The stopper piece 28 projects toward the vehicular front side from the vehicular front end portion 27 of the lifted handle member 25 and has recesses 28A at two ends thereof.

When the handle member 25 is in the horizontal state, the stopper piece 28 and the projecting piece 128 project downward and the projecting piece 128 is stopped by a stopper 29 included in the floor surface 11 and the handle member 25 is kept in the horizontal state. To move the handle member 25 from the horizontal state to the lifted state, a button 24 that is included in the floor surface 11 and exposed through a hole 23 of the handle member 25 is pressed such that engagement of the stopper 29 and the projecting piece 128 is released and the handle member 25 can be lifted up. When the handle member 25 is in the horizontal state, the stopper piece 28 is fit in a hole 60 in the deck board 20.

The vehicle 100 includes the package tray 30 in an upper section of the luggage room 10. The package tray 30 is above the deck board 20 and the first storing space 80 is between the deck board 20 and the package tray 30. The package tray 30 is connected to the vehicular back door via the connecting member 40 and lifted up and down according to the opening and closing of the back door. Specifically, according to the moving of the back door from a closed state to an open state, the package tray 30 is lifted upward (pivoted) around a vehicular front edge portion 39 and moved from the horizontal state in FIG. 1 to the tilted state in FIGS. 2 and 3.

Figure 6:
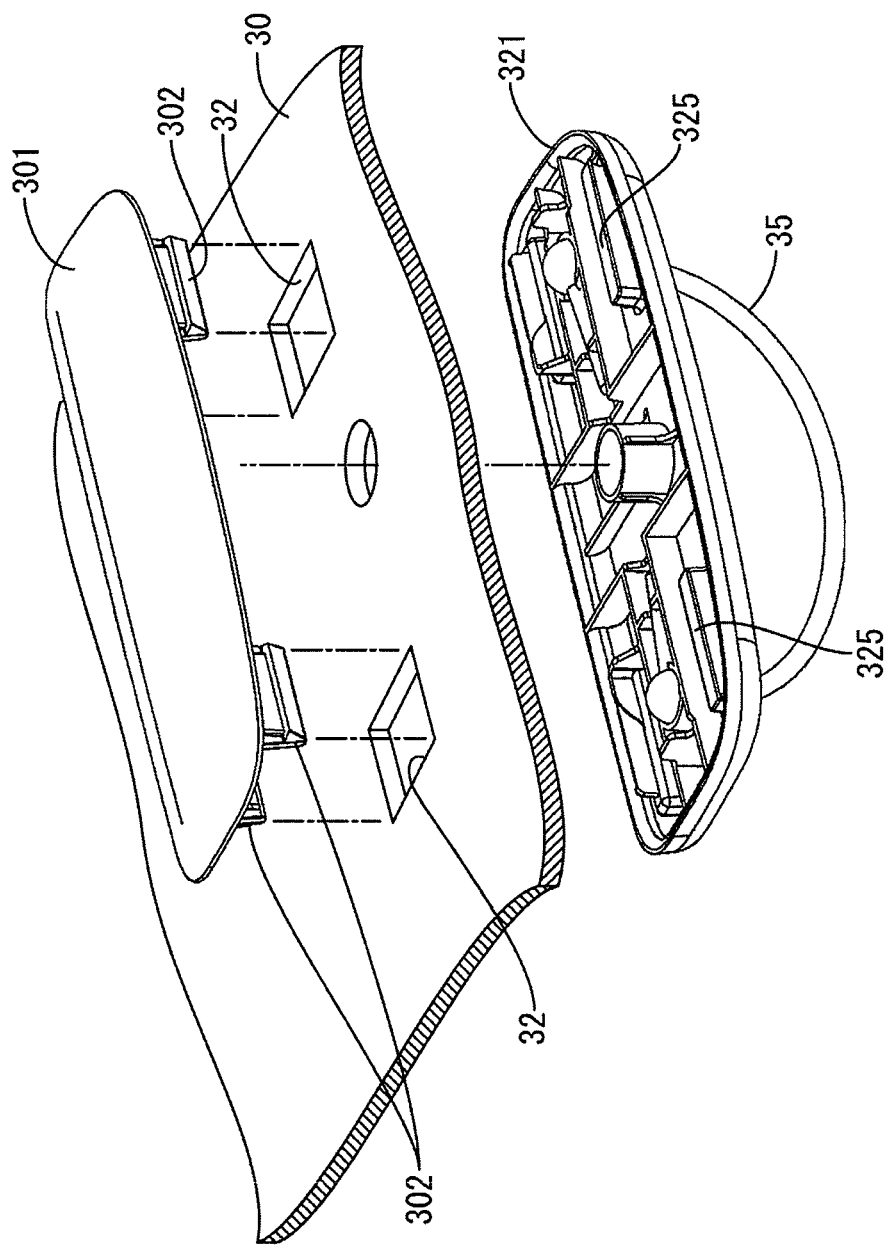
FIG. 6 is a partially exploded perspective view illustrating arrangement of a string member in the package tray.

As illustrated in FIGS. 2 and 6, the package tray 30 includes a string member 35 (a connector member) on a rear surface 31 thereof. The handle member 25 is connected to the string member 35. When the deck board 20 is in the tilted state, the handle member 25 is in the lifted state and connected to the string member 35 on the rear surface 31 side of the package tray 30. Specifically, the string member 35 is hooked on the stopper piece 28 of the handle member 25 so as to be stopped by the recesses 28A and the deck board 20 is fixed to the package tray 30.

As illustrated in FIG. 6, the string member 35 is attached to the package tray 30 with a first mounting member 301 and a second mounting member 321. The first mounting member 301 includes fitting projections 302. The first mounting member 301 is mounted on a front surface of the package tray 30 such that the fitting projections 302 of the first mounting member 301 project through insertion holes 32 of the package tray 30 from the front surface to the rear surface of the package tray 30. The second mounting member 321 is mounted on a rear surface of the package tray 30 and includes fitting recesses 325 that are fit to the fitting projections 302 projecting from the rear surface of the package tray 30. The second mounting member 321 further includes the string member 35. The string member 35 is fixed to the second mounting member 321 and suspended in a semicircular shape. The stopper piece 28 of the handle member 25 of the deck board 20 is connected to the string member 35 of the semicircular shape on the rear surface of the package tray 30. Namely, the string member 35 is hooked on the recesses 28A of the stopper piece 28.

Next, movement of the package tray 30 and the deck board 20 and holding of the deck board 20 in the tilted state will be described with reference to FIG. 4.

Figure 4:
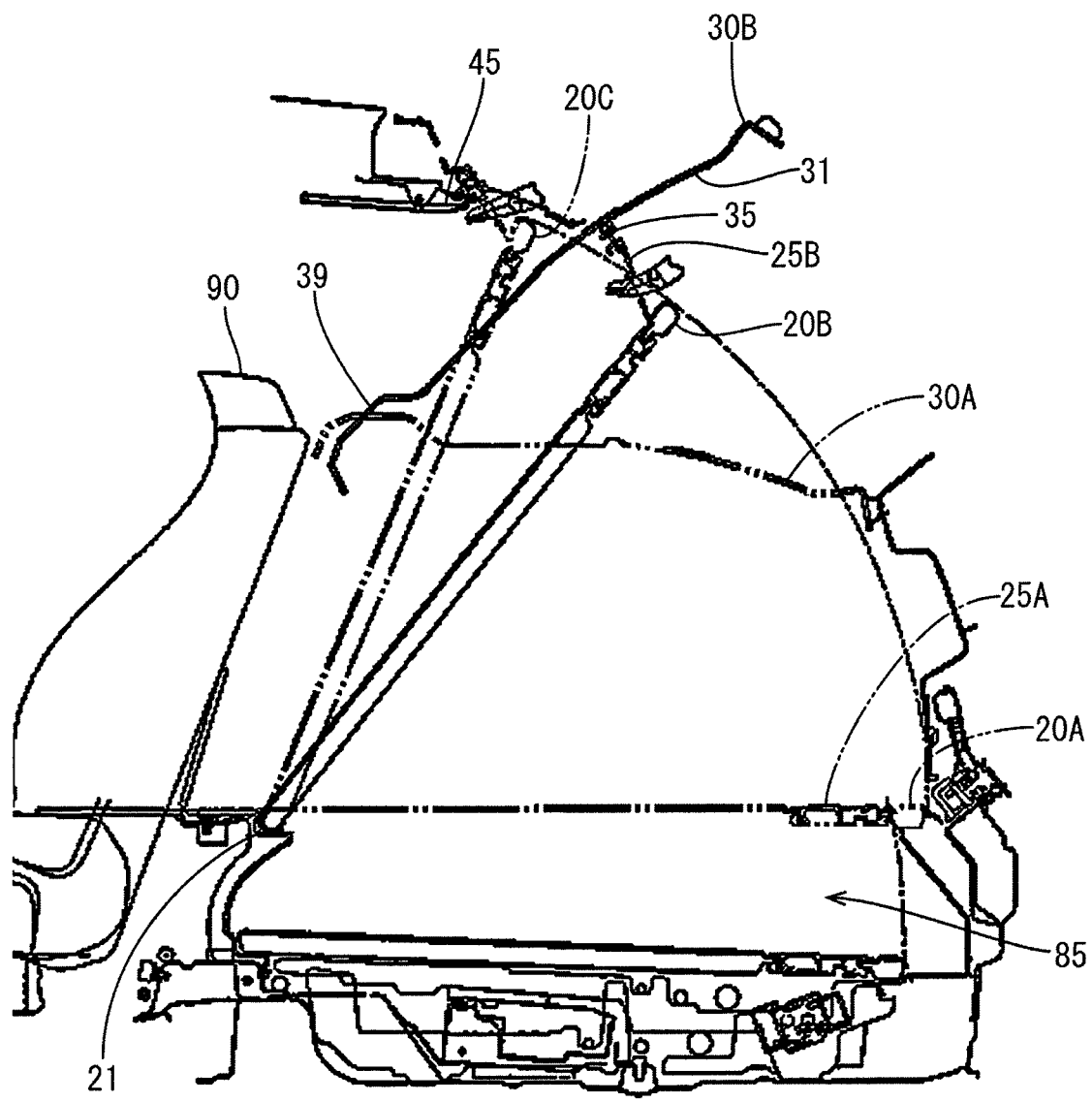
FIG. 4 is a side view of the deck board and the package tray that are lifted up and connected to each other.

In FIG. 4, the package tray in the horizontal state is referred to as a horizontal package tray 30A and that in the tilted state is referred to as a tilted package tray 30B. The horizontal package tray 30A is moved around the vehicular front edge portion 39 as a pivot and lifted upward according to the opening of the back door. When the back door is open, the package tray 30B is in the tilted state. The string member 35 that is mounted on the rear surface 31 of the tilted package tray 30B is exposed through the rear side opening 1 as illustrated in FIG. 2. When the back door is open and the package tray 30B is in the tilted state, the deck board 20 can be lifted up so that the second storing space 85 that is below the deck board 20 can be accessed.

The horizontal handle member 25A is lifted up from the hole 60 and the lifted handle member 25B is held and pulled upward by an operator. Accordingly, the horizontal deck board 20 A is easily lifted up. The lifted handle member 25B of the lifted deck board 20B is connected to the string member 35 attached on the rear surface 31 of the tilted package tray 30B such that the lifted deck board 20B is kept in the lifted state. The string member 35 hooked on the stopper piece 28 is stopped at the recesses 28A of the lifted handle member 25B of the lifted deck board 20B such that the string member 35 is surely held by the lifted handle member 25B and is less likely to be released from the lifted handle member 25B. In a vehicle without including the package tray 30, the lifted handle member 25B is stopped at a door opening upper edge portion 45 such that a deck board 20C is kept in an open tilted state. In the open tilted state, the deck board 20C is tilted at a tilting angle greater than that of the lifted deck board 20B.

In the luggage room assembly 200 according to this embodiment, the handle member 25 projecting from the floor surface 11 of the deck board 20 can be held and pulled upward by an operator to lift up the deck board 20. After the deck board 20 is lifted up, the handle member 25 held by an operator is connected to the rear surface of the lifted package tray 30 such that the deck board 20 is kept in the lifted state (the tilted state) easily. The deck board 20 is kept in the lifted state by being connected to the rear surface of the package tray 30. Therefore, the deck board 20 is lifted at a large angle such that the second storing space 85 below the deck board 20 can be accessed easily. When the deck board 20 is not lifted and in the normal state (the laid state), the handle member 25 is not projected from the floor surface 11. Therefore, other components are less likely to be damaged by the projected component.

The handle member 25 is movable between the horizontal state and the lifted state. The handle member 25 in the horizontal state is moved to the lifted state by moving the vehicular front end portion 27 upward around the vehicular rear end portion 26 as the pivot (a rotation axis). Thus, the handle member 25 is lifted up. The handle member 25 includes the stopper piece 28 projecting toward the vehicular front side when the handle member 25 is in the lifted state. The stopper piece 28 is connected to the rear surface side of the package tray 30. The handle member 25 that keeps the lifted state of the lifted deck board 20 includes the stopper piece 28 projecting toward the vehicular front side. With such a configuration, in lifting the vehicular rear edge 22 of the deck board 20 upward and toward the vehicular front side, the deck board 20 is lifted up by pulling the lifted handle member 25 and the handle member 25 included in the front surface of the deck board 20 is connected to the string member 35 mounted on the rear surface side of the package tray 30 smoothly.

In this embodiment, the package tray 30 is moved from the horizontal state to the tilted state according to the opening of the door of the luggage room 10. The package tray 30 has the string member 35 on the rear surface 31 and string member 35 is hooked on the stopper piece 28 of the handle member 25. The package tray 30 is configured to be moved from the horizontal state to the tilted state and the lifted deck board 20 may not be connected to the rear surface of the package tray 30 depending on the tilted angle of the package tray 30. However, the lifted deck board 20 is connected to the string member 35 in this embodiment and the string member 35 may change its shape easily. Therefore, the deck board 20 can be connected to the rear surface of the package tray 30 at an adjustable angle with the semicircular shape of the string member 35 that is suspended and deformable.

In this embodiment, the deck board 20 is configured not to be folded and has no folding marks (a folding line). Namely, the deck board 20 is formed from a single plate. However, as illustrated in FIGS. 7 and 8, a deck board 120 may be configured to be folded.

Figure 7:
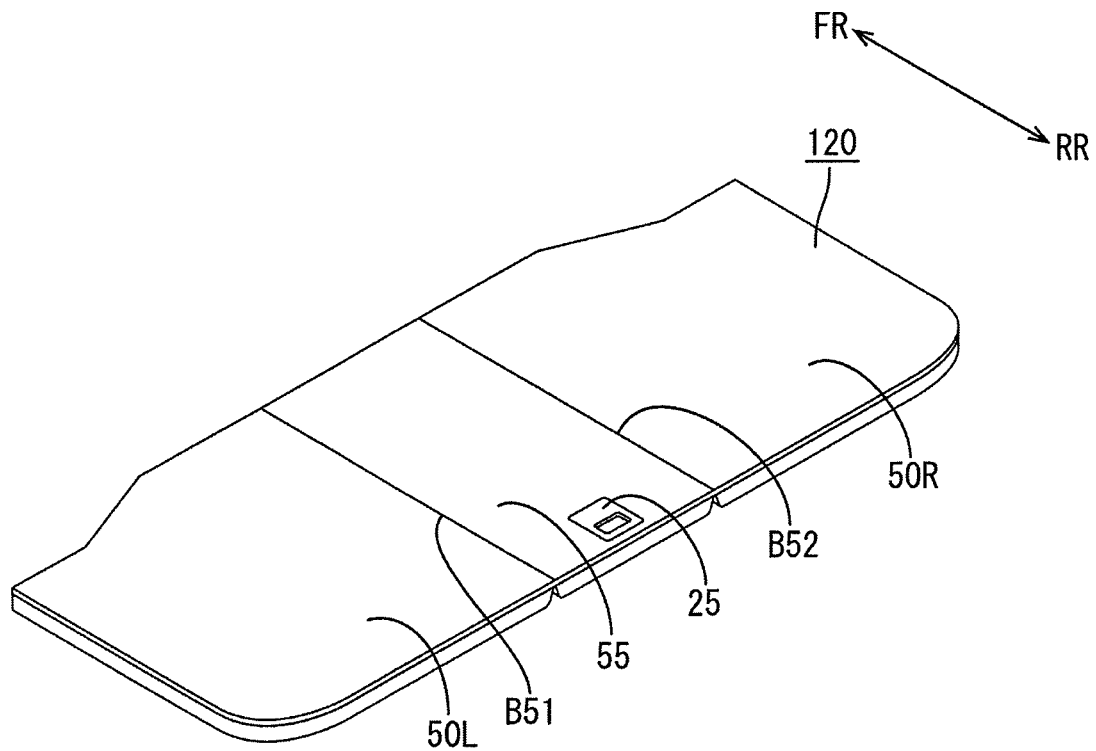
FIG. 7 is a perspective view illustrating a deck board according to a modification.
Figure 8:
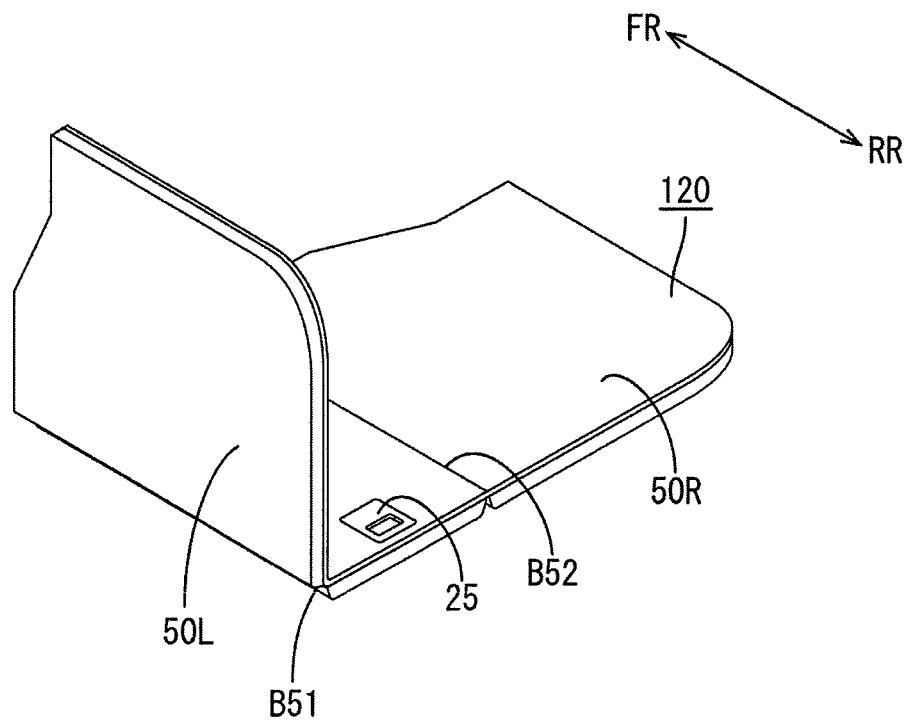
FIG. 8 is a perspective view illustrating the deck board of FIG. 7 a part of which is folded.

As illustrated in FIGS. 7 and 8, the deck board 120 is formed of one plate member that can be folded with respect to the vehicular width direction and has two folding lines extending along the vehicular front-rear direction and including a first folding line B51 and a second folding line B52. Specifically, the deck board 120 is configured with three sections including a middle board section 55, a left board section 50L, and a right board section 50R. The middle board section 55 is a middle section of the deck board 120 with respect to the vehicular width direction and has a certain width. The left board section 50L is on a left side of the middle board section 55 with respect to the first folding line B51. The right board section 50R is on a right side of the middle board section 55 with respect to the second folding line B52.

The deck board 120 includes an integral hinge at each of the first folding line B51 and the second folding line B52 and the integral hinge is configured by partially reducing a thickness of the deck board 120. According to such a configuration, as illustrated in FIG. 8, the left board section 50L that is on the left side of the middle board section 55 with respect to the vehicular width direction and in a flat state can be folded at the first folding line B51 on an upper side and a luggage room interior side. Similarly, the right board section 50R that is on the right side of the middle board section 55 with respect to the vehicular width direction and in the flat state can be folded at the second folding line B52 on the upper side and the luggage room interior side. The middle board section 55 includes the handle member 25 similar to the above embodiment in the vehicular rear section of the floor surface. The foldable deck board 120 includes the handle member 25 in the middle board section 55 and is configured to be folded upward. Therefore, if the foldable deck board 120 is pulled upward, the deck board 120 is not folded during the lifting and the connection to the package tray 30 and thus, the deck board 120 is lifted up and connected to the package tray 30 stably.

The invention claimed is:

1. A luggage room assembly mounted in a vehicle comprising:
   a deck board configured to be movable between a laid state and a lifted state and including a handle member on a floor surface thereof, the handle member being movable between a projected state in which the handle member projects from the floor surface and a non-projected state in which the handle member does not project from the floor surface; and
   a package tray disposed above the deck board and having a rear surface that is opposite the floor surface of the deck board and to which the handle member in the projected state is connected when the deck board is in the lifted state.

2. The luggage room assembly mounted in a vehicle according to claim 1, wherein
   the handle member is configured to pivot around a vehicular rear end portion thereof and to be movable between a horizontal state that is the non-projecting state and a lifted state that is the projected state,
   the handle member is configured to be moved from the horizontal state to the lifted state by lifting upward a vehicular front end portion of the handle member around the vehicular rear end portion thereof, and
   the handle member includes a stopper piece at the vehicular front end portion thereof and the stopper piece of the handle member in the lifted state projects toward a vehicular front side and is connected to the rear surface of the package tray.

3. The luggage room assembly mounted in a vehicle according to claim 1, wherein
   the package tray is configured to be movable between a horizontal state and a tilted state according to opening and closing of a door of the luggage room, and
   the package tray includes a connector member on the rear surface and the handle member is connected to the connector member.

4. The luggage room assembly mounted in a vehicle according to claim 1, wherein the deck board has a folding line extending in a vehicular front-rear direction and the deck board is folded along the folding line with respect to a vehicular width direction.

5. The luggage room assembly mounted in a vehicle according to claim 4, wherein
   the folding line includes a first folding line and a second folding line and the deck board is defined into at least three sections by the first folding line and the second folding line with respect to the vehicular width direction, the three sections include a middle board section between the first folding line and the second folding line, a right board section and a left board section adjacent to the middle board section with respect to the vehicular width direction, the left board section is folded at the first folding line and the right board section is folded at the second folding line, and the middle board section includes the handle member.

6. The luggage room assembly mounted in a vehicle according to claim 1, wherein the deck board includes the handle member in a vehicular rear edge portion thereof and the deck board is tilted such that the vehicular rear edge portion of the deck board is located higher than a vehicular front portion thereof in the lifted state, and the handle member of the deck board in the lifted state is in the projected state and connected to a vehicular rear edge portion of the package tray.

7. The luggage room assembly mounted in a vehicle according to claim 2, wherein the package tray is configured to be movable between a horizontal state and a tilted state according to opening and closing of a door of the luggage room, and the package tray includes a connector member on the rear surface and the handle member is connected to the connector member.

8. The luggage room assembly mounted in a vehicle according to claim 7, wherein the stopper piece has two recesses on two ends thereof with respect to a vehicular width direction.

9. The luggage room assembly mounted in a vehicle according to claim 3, wherein the connector member is a string member that is projected from the rear surface of the package tray.

10. The luggage room assembly mounted in a vehicle according to claim 9, wherein the stopper piece has two recesses on two ends thereof with respect to a vehicular width direction.

11. The luggage room assembly mounted in a vehicle according to claim 6, wherein the handle member is configured to pivot around a vehicular rear end portion thereof and to be movable between a horizontal state that is the non-projecting state and a lifted state that is the projected state, the handle member is configured to be moved from the horizontal state to the lifted state by lifting upward a vehicular front end portion of the handle member around the vehicular rear end portion thereof, and the handle member includes a stopper piece at the vehicular front end portion thereof and the stopper piece of the handle member in the lifted state projects toward a vehicular front side and is connected to the rear surface of the package tray.

12. The luggage room assembly mounted in a vehicle according to claim 11, wherein the package tray is configured to be movable between a horizontal state and a tilted state according to opening and closing of a door of the luggage room, and the package tray includes a connector member on the rear surface and the handle member is connected to the connector member.

13. The luggage room assembly mounted in a vehicle according to claim 12, wherein the connector member is a string member that is projected from the rear surface of the package tray.

14. The luggage room assembly mounted in a vehicle according to claim 13, wherein the stopper piece has two recesses on two ends thereof with respect to a vehicular width direction.

* * * * *